June 27, 1950     F. O. HESS     2,513,174
GAS FILTER
Filed Feb. 23, 1946
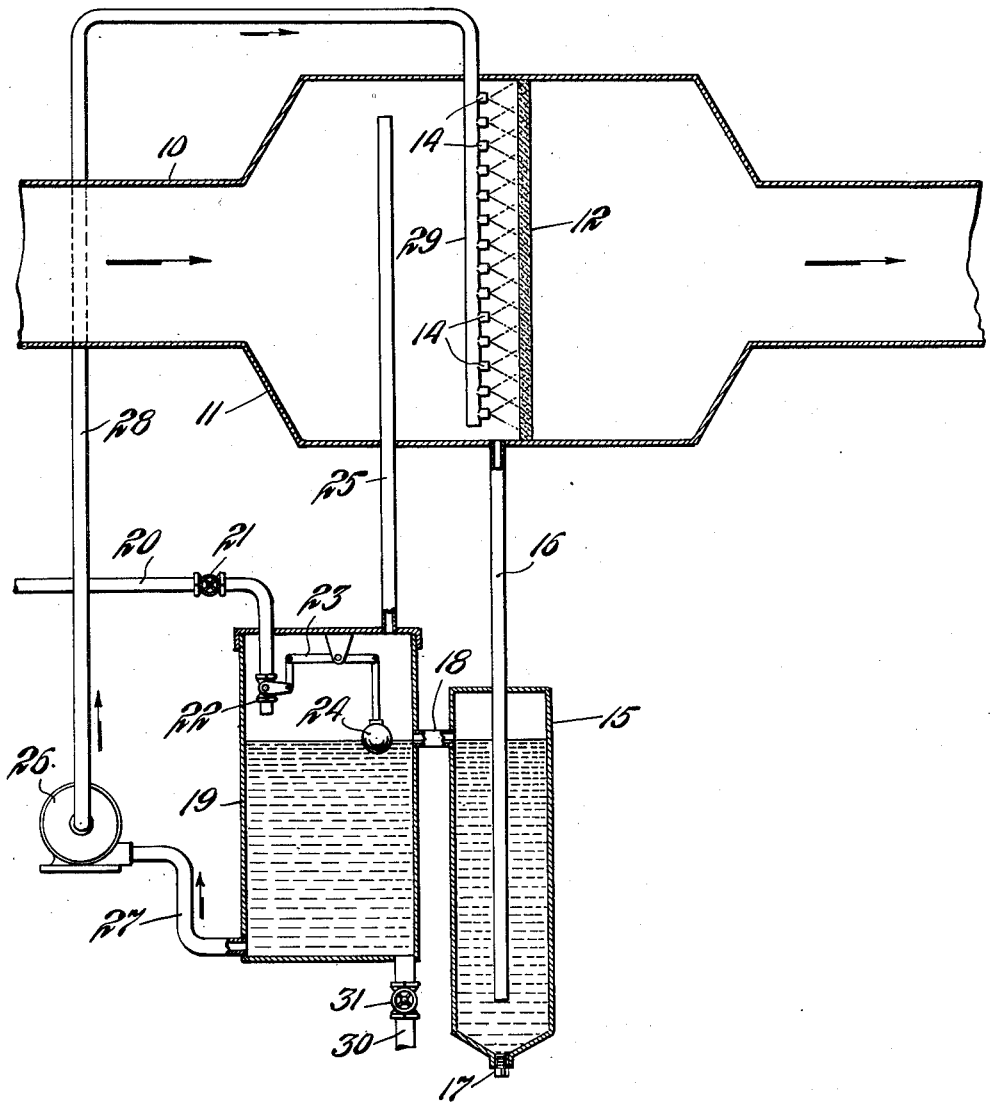
INVENTOR
Frederic O. Hess
BY
his ATTORNEY Patented June 27, 1950

2,513,174

UNITED STATES PATENT OFFICE 2,513,174

GAS FILTER

Frederic O. Hess, Philadelphia, Pa., assignor to Selas Corporation of America, Philadelphia, Pa., a corporation of Pennsylvania Application February 23, 1946, Serial No. 649,676

10 Claims. (Cl. 183—16)

This invention relates to filters, and is especially concerned with removing entrained liquid and foreign matter or foreign matter alone from a gaseous fluid.

It is an object of the invention to provide an improvement for effecting phase separation of entrained liquid from a gaseous fluid with the aid of a porous member from a face of which foreign matter can be effectively removed by washing the face with liquid of the kind being separated or another liquid immiscible with the gaseous fluid.

Another object of the invention is to provide an improvement for removing from a gaseous fluid foreign matter entrained therein with the aid of a porous member which is repellent to and not wettable by a liquid utilized to wash a face of the member first contacted by the gaseous fluid to prevent clogging of the member by the foreign matter tending to lodge thereon.

The above and other objects and advantages of the invention will be more fully understood from the following description taken in conjunction with the accompanying drawing forming a part of this specification, and in which the single figure more or less diagrammatically illustrates a section of a gas line in which the invention is embodied.

Referring to the drawing, liquid accompanying and entrained in a gaseous fluid is removed therefrom in accordance with the invention by causing the gaseous fluid to flow through a conduit 10 which may be formed with an enlarged portion 11 having a porous member 12 therein. The gas flows through the conduit 10 in the direction indicated by the arrows and in the casing or enlarged portion 11 contacts the porous member 12. The member 12 is permeable to the gas and impervious to a liquid, such as water, for example, which is immiscible with the gas and accompanies the latter. The gaseous fluid from which the accompanying liquid is stripped passes through the porous member 12 and flows from the enlarged portion 11 of the conduit 10 to a place of use.

The porous member 12 also serves as a filter which effectively removes foreign matter accompanying the gas. Such foreign matter tends to lodge on the face of the porous member 12 and clog the latter, thereby reducing the effective cross sectional area of the porous member 12 through which the gaseous fluid can freely pass.

In order to prevent foreign matter from lodging on and clogging the porous member 12, the face thereof first contacted by the gas is washed by a suitable liquid at the same time that removal of entrained liquid is being effected from the gas. This may be accomplished by providing a bank of spray nozzles 14 arranged to spray liquid over the entire face of the porous member first contacted by the gas. While only a single vertical row of nozzles 14 is shown in the drawing, it is to be understood that a number of rows of nozzles 14 may be disposed alongside one another to produce effective spraying and washing of all surface portions of the porous member 12.

A system may be provided for recirculating the liquid supplied to the nozzles 14 for washing the face of porous member 12 at which foreign matter tends to lodge. As shown in the drawing, such a system may include a sump 15 into which liquid passes through a conduit 16 from the casing 11. The conduit 16 terminates in the lower part of the sump 15 so that foreign matter will be carried into the bottom part thereof, a threadedly connected plug 17 being provided which may be removed when desired to drain foreign matter settling and accumulating in the bottom of the sump.

From the upper part of the sump 15 liquid passes through a connection 18 into a vessel 19. Make-up liquid is supplied to the vessel 19 through a conduit 20 having a manually operable valve 21 outside the vessel and another valve 22 within the vessel which is connected by mechanism 23 to a float 24 and arranged to open only when the float falls below a predetermined liquid level in vessel 19.

A conduit 25 extends from the vessel 19 into the upper part of casing 11, whereby the pressure in vessel 19 is equalized with the pressure in the casing 11. A pump 26 is connected by a conduit 27 to the bottom of the vessel 19 for raising liquid therefrom through a vertical riser 28 which is connected at its upper end to a manifold 29 to which the nozzles 14 are fixed. A drain conduit 30 having a valve 31 therein is connected to the bottom of the vessel 19 to facilitate cleaning and washing of that vessel when this becomes necessary.

The porous member 12 may be formed of ceramic material or of flexible fabric, such as, for example, canvas, cotton or linen duck, cloth formed of glass fibers and the like. Although the porous member 12 is diagrammatically illustrated as being permanently mounted within the casing or enlarged portion 11 of the conduit 10, it should be understood that in practicing the invention the member 12 may be mounted on a suitable frame and removably positioned in the casing 11, a suitable opening or slot and cooperating panel being provided in a side thereof to facilitate removal and insertion of the member 12. Also, a number of filter elements may be disposed within the casing 11 in place of a single porous member 12 as illustrated, whereby a portion of the gas stream passes through each of the elements. In any event, the filter structure is effectively sealed in any suitable manner within the casing 11 so that the only fluid passing through the conduit 10 to the place of use will be the gaseous fluid to which the porous member is permeable.

The porous member 12 may be treated so that it will be inherently permeable to a gaseous fluid and repellent to a liquid entrained in the gas and immiscible therewith. Thus, in practicing the invention to remove water from a gas immiscible therewith, the material of which the porous member 12 is formed is rendered water repellent in any suitable well known manner while still permitting the gas to pass therethrough. The ceramic material or any one of the above-mentioned flexible fabrics forming the porous member 12 may be made hydrophobic and repellent to water by treating the material or fabric with a water repellent composition, such as, for example, metallic soaps, plasticized polyvinyl chloride, synthetic resins, silicones, or a composition comprising an organo-silicon halide, as disclosed in Patnode Patent No. 2,306,222. When heat curing silicones are employed to treat materials to render them hydrophobic, the surfaces produced are hard and insoluble in hydrocarbon liquids.

Let us suppose that a hydrophobic porous member 12 is embodied in a gaseous fuel conduit having water entrained therein and containing foreign matter, such as dust, dirt and carbon and ash particles, for example. The gaseous fuel flowing under pressure through the conduit 10 enters the casing or enlarged portion 11 thereof, and, since the porous member 12 is permeable to any gas, gaseous fuel will freely pass therethrough to the place of use. Water accompanying the gaseous fuel and entering the casing 11 will contact a face of the porous member 12; but, since that member is rendered water repellent, the member 12 will not be wetted by the water and water is prevented by its surface tension from passing into the pores thereof. In other words, the water is prevented from passing into the pores or passages of the member 12 to displace the gaseous fluid therein so long as the pressure differential across the member 12 does not overcome the surface tension of the liquid at the face of the member first contacted by the gaseous fluid.

Hence, so long as the pressure differential across the wall formed by the member 12 does not exceed a predetermined maximum value, which may be referred to as the "rupture pressure", the interface between the gaseous fuel in the pores of the member 12 and the water contacting the left-hand face thereof will not be ruptured and the gaseous fuel in the pores will not be displaced by water. The "rupture pressure" is dependent upon several factors including the surface tension of the liquid and the maximum pore size of the porous member. The "rupture pressure" increases for liquids having higher surface tension value, and is inversely proportional to pore size and decreases with increase in the maximum pore size of the porous member.

Liquid to be separated and entrained in the gaseous fluid may be in the form of a fine mist or tiny droplets. If provision were not made for washing the porous member 12, as described above, such fine mist and tiny droplets at the left-hand face of the member 12 would coalesce to form larger and heavier drops which eventually fall by gravity to the bottom of the enlarged portion 11 of the conduit 10. However, when no provision is made for washing the member 12, foreign matter in the gaseous fluid tends to lodge on and clog that member, as pointed out above. This is especially true when the entrained liquid is separated from a gaseous fuel, such as coke oven gas or blast furnace gas, for example, which contains a relatively high amount of foreign matter including dust, dirt, and carbon and ash particles and the like.

By spraying and washing the member 12 with a liquid which is immiscible with the gaseous fluid and to which the member 12 is repellent, effective and efficient cleaning of the gaseous fluid is accomplished at the same time that entrained liquid is separated and removed from the gaseous fluid. When the porous member is rendered hydrophobic and repellent to water and aqueous solutions, for example, entrained water can be effectively removed from a gaseous fluid, such as gaseous fuel, and the porous member 12 can be sprayed with water to wash and clean the face or surface thereof first contacted by the gaseous fluid. In such case fine mist and tiny droplets of water entrained in the gaseous fluid and the spray water discharged from the nozzles 14 coalesce and unite and flow by gravity on the wetted face or surface of the member 12 to the bottom of casing 11. When the porous member 12 is hydrophobic in character and repellent to water, neither the water entrained in the gaseous fluid nor the spray water discharged from the nozzles 14 can pass through the pores of that member and displace the gaseous fluid filling the pores so long as the pressure differential across the member 12 does not exceed the "rupture pressure" referred to above.

Since the porous member 12 may affect the gas pressure available at a place of use, it is desirable to employ a member having pores or passages of relatively large size so that the pressure differential across that member will be as small as possible. In practicing the invention it has been found that a member 12 having pores of about 100 microns in diameter is quite satisfactory for use in gaseous fuel and compressed air lines in which removal of entrained water is desired. In supply conduits in which the gaseous fluid is at a pressure ranging from 25 to 100 pounds per square inch, the maximum pressure differential across a hydrophobic porous member of ceramic material, having pores of about 100 microns in diameter, is in the neighborhood of 10 to 16 inches of water column; and this has been found to be insufficient to cause the gaseous fluid filling the pores to be displaced by the liquid at the surface of the member first contacted by the gaseous fluid.

When the delivery pressure of the gaseous fuel is at a lower value, such as five pounds per square inch, for example, which is a delivery pressure often used in practice, the maximum pore size permissible in the porous member may be increased since the pressure differential produced across the porous member at such lower delivery pressure will be smaller. In many situations the pressure drop of the gaseous fluid across the member 12 is of no consequence because it is necessary to employ pressure reducing devices in existing supply lines to reduce the gas pressure before flowing to a place of use. In any event, it is desirable in most instances to employ a porous member 12 having the pores or passages therein as large as possible so that an optimum rate of flow of the gaseous fluid is effected through the member 12, such flow being proportional to the square of the size of the openings.

When the invention is practiced to effect removal of liquid from a gaseous fluid, only phase separation of such liquid from the fluid is accomplished. In other words, in order to remove entrained water from air or any other gaseous fluid, for example, the water must be in liquid phase. Fluid to be separated and in vapor form will pass through the member 12 together with the gaseous fluid flowing therethrough. However, for practical purposes, such phase separation is quite satisfactory in most commercial applications where it is desired to remove from a gaseous fluid liquid which is entrained therein. In addition, foreign matter is effectively removed from the gaseous fluid at the same time that phase separation of the entrained liquid from the gaseous fluid is accomplished, as explained above.

In many industrial applications the problem of removing liquid entrained in a gaseous fluid is not present or such removal may not be necessary, but the problem of continuously removing foreign matter from a gaseous fluid is present. In such cases it has been the practice heretofore to provide a plurality of filtering units connected in parallel whereby the filtering units can be employed alternately to permit cleaning or replacement of the filtering medium in one of the units after it has become clogged with foreign matter.

The invention may be practiced effectively where only removal of foreign matter from a gaseous fluid is desired. In such case only a single filtering unit is required and the filtering medium therein may be employed for long periods of time without cleaning or replacement, because foreign matter tending to lodge on the filtering medium may be removed therefrom continuously by a washing liquid. The filtering medium or porous member is repellent to the washing liquid so that the latter cannot wet the medium and will not pass therethrough so long as the pressure differential across the wall of the filtering medium does not exceed the "rupture pressure," as explained above.

Although a single embodiment of the invention has been shown and described, it will be apparent that various modifications and changes may be made without departing from the spirit and scope of the invention, as pointed out in the following claims.

What is claimed is:

1. A method of simultaneously removing from a gaseous fluid accompanying foreign matter and entrained liquid immiscible with the fluid, which includes causing the gaseous fluid to pass through a porous wall member which is permeable to such fluid and impervious to the liquid to be removed therefrom, and, while the gaseous fluid is passing through the member, washing the face thereof first contacted by the gaseous fluid by a liquid immiscible with the gaseous fluid and to which the member is impervious so as to carry off foreign matter tending to lodge on and clog the member.

2. In the art of effecting phase separation of a liquid and a gaseous fluid immiscible therewith, the improvement which comprises passing the gaseous fluid through a porous member which is permeable to such fluid and impervious to the liquid to be separated therefrom, washing the face of the member first contacted by the gaseous fluid by a liquid immiscible therewith and to which the member is impervious so as to carry off foreign matter accompanying the gaseous fluid and tending to lodge on and clog the member, and causing the gaseous fluid to pass through the member by producing a pressure differential across the latter which is ineffective to cause gaseous fluid filling the pores of the member to be displaced by liquid at the face thereof first contracted by the gaseous fluid.

3. In the art of separating a gaseous fluid and water in liquid phase which is entrained in such fluid and immiscible therewith, which comprises causing the gaseous fluid to pass through a hydrophobic porous member which is permeable to such fluid and impervious to the entrained water, and washing the face of the member first contacted by the gaseous fluid by water so as to carry off foreign matter accompanying the gaseous fluid and tending to lodge on and clog the wall member.

4. In the art of removing from a gaseous fluid foreign matter entrained therein, the improvement which comprises causing the gaseous fluid to pass through a porous member and washing the face of the member first contacted by the gaseous fluid by a liquid to which the porous member is repellent so as to carry off the foreign matter tending to lodge on and clog the member.

5. In the art of removing from a gaseous fluid foreign matter entrained therein, the improvement which comprises causing the gaseous fluid to pass through a porous member, washing the face of the member first contacted by the gaseous fluid by a liquid to which the porous member is repellent so as to carry off the foreign matter tending to lodge on and clog the member, and causing the gaseous fluid to pass through the member by producing a pressure differential across the latter which is ineffective to cause gaseous fluid filling the pores of the member to be displaced by the liquid.

6. Apparatus for separating from a gaseous fluid liquid entrained in such fluid and immiscible therewith and foreign matter accompanying the fluid, such apparatus including a casing having an inlet and an outlet, means interposed between the inlet and outlet including a porous member permeable to the gaseous fluid and impervious to the entrained liquid, and means to cause liquid, which is immiscible with the gaseous fluid and to which said member is pervious, to be directed onto the face thereof first contacted by the gaseous fluid to carry off foreign matter tending to lodge on and clog said member.

7. Apparatus for separating from a gaseous fluid accompanying foreign matter and water entrained therein, such apparatus including a casing having an inlet and an outlet, means interposed between the inlet and outlet including a hydrophobic porous member, and means to cause water to be directed onto the face of said member first contacted by the gaseous fluid to carry off foreign matter tending to lodge on and clog said member.

8. Apparatus for separating from a gaseous fluid liquid entrained in such fluid and immiscible therewith and foreign matter accompanying the fluid, such apparatus including a casing having an inlet and an outlet, means interposed between the inlet and outlet including a porous member permeable to the gaseous fluid and impervious to the entrained liquid, spray means for directing liquid, which is immiscible with the gaseous fluid and to which said member is impervious, against the face thereof first contacted by the gaseous fluid to wash said member and carry off foreign matter tending to lodge thereon, and structure for recirculating liquid from the bottom of the casing to the spray means including means to facilitate removal of foreign matter carried by the liquid.

9. Apparatus for separating from a gaseous fluid accompanying the foreign matter and water entrained therein, such apparatus including a casing having an inlet and an outlet, means including a hydrophobic porous member interposed between the inlet and outlet, means for applying water against the face of said member first contacted by the gaseous fluid to carry off foreign matter tending to lodge on and clog said member, means for returning water from the bottom of said casing to said applying means including a vessel into which water flows from said casing, a pressure equalizing connection between said vessel and said casing, and means including a conduit and valve means therein operable responsive to the fluid level in said vessel for introducing make-up water into the latter.

10. Apparatus for removing from a gaseous fluid foreign matter entrained therein, such apparatus including a casing having an inlet and an outlet, means interposed between the inlet and outlet including a porous member permeable to the gaseous fluid, spray means for directing liquid against the face of the member first contacted by the gaseous fluid to wash the member and carry off foreign matter tending to lodge thereon, said member being repellent to and not wettable by the liquid, and structure for recirculating liquid from the bottom of the casing to the spray means including means to facilitate removal of foreign matter carried by the liquid.

FREDERIC O. HESS.

REFERENCES CITED

The following references are of record in the file of this patent:

UNITED STATES PATENTS

| Number | Name | Date |
|---|---|---|
| 165,141 | White | June 29, 1875 |
| 1,986,914 | Anthony | Jan. 8, 1935 |
| 2,031,437 | Vincent | Feb. 18, 1936 |
| 2,057,579 | Kurth | Oct. 13, 1936 |
| 2,199,632 | Keyes | May 7, 1940 |
| 2,359,386 | Reinsch | Oct. 3, 1944 |
| 2,386,259 | Norton | Oct. 9, 1945 |